United States Patent [19]
Myers et al.

[11] 3,911,190
[45] Oct. 7, 1975

[54] COMPOSITE CONSTRUCTION

[75] Inventors: Robert A. Myers; A. Russell Hoge, both of Wilbraham, Mass.

[73] Assignee: Monsanto Company, St. Louis, Mo.

[22] Filed: Dec. 23, 1974

[21] Appl. No.: 535,650

[52] U.S. Cl. .................. 428/315; 9/6; 156/78; 156/79; 264/46.5; 264/216; 312/214; 428/519
[51] Int. Cl.² ......................................... B32B 3/26
[58] Field of Search ......... 312/214; 9/6; 156/79, 78; 264/46.5, 216; 260/879; 161/160, 161, 253

[56]  References Cited
UNITED STATES PATENTS

| | | | |
|---|---|---|---|
| 3,041,220 | 6/1962 | Martin et al. | 161/161 |
| 3,091,946 | 6/1963 | Kesling | 161/161 |
| 3,221,085 | 11/1965 | Rill, Jr. et al. | 264/46.5 |
| 3,437,628 | 4/1969 | Isley et al. | 264/216 |
| 3,451,538 | 6/1969 | Trementozzi | 260/879 |
| 3,459,628 | 8/1969 | Dixon et al. | 161/161 |
| 3,563,845 | 2/1971 | Stevens | 161/160 |
| 3,565,746 | 2/1971 | Stevens | 161/160 |
| 3,853,685 | 12/1974 | Friedrich | 161/161 |
| 3,862,880 | 1/1975 | Feldman | 161/160 |

FOREIGN PATENTS OR APPLICATIONS 887,008    1/1962    United Kingdom

Primary Examiner—William J. Van Balen

[57] ABSTRACT

Disclosed herein is a composite structure comprising a layer of a gas filled cellular insulation material combined with a layer of impact resistant thermoplastic sheet material wherein a rubber modified high nitrile polymer containing at least 55 percent by weight of nitrile monomer units (calculated as acrylonitrile) is interposed between the gas filled cellular material and the thermoplastic sheet. The high nitrile polymer layer presents an effective barrier to the gas in the cellular material and provides improved impact strength in the composite while retaining good rigidity of the composite structure.

10 Claims, 4 Drawing Figures

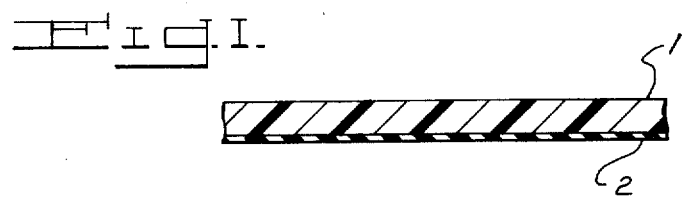
Fig. I.
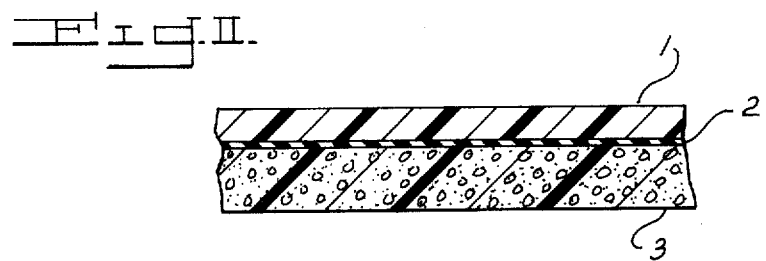
Fig. II.
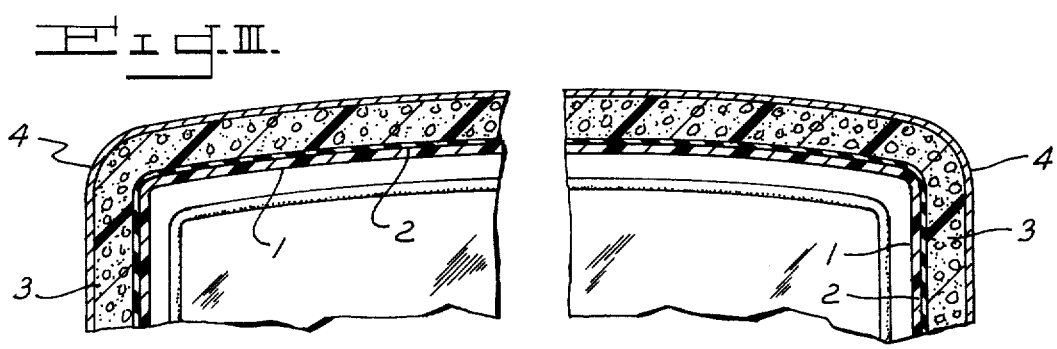
Fig. III.
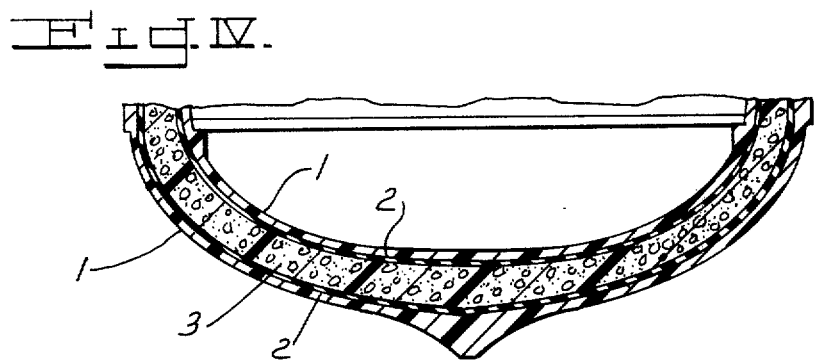
Fig. IV.

COMPOSITE CONSTRUCTION

FIELD OF THE INVENTION

The present invention relates to composite structures comprising a layer of a gas filled cellular material, a layer of a rubber modified high nitrile polymer and a layer of a thermoplastic polymer such as ABS.

DESCRIPTION OF THE PRIOR ART

Composite panels comprising a cellular insulation material bonded to a thermoplastic sheet are commonly prepared by foaming-in-place techniques. The resulting composite structure is used in a wide variety of applications to provide thermal insulation, accoustical insulation and in certain applications buoyancy. Examples of these applications include refrigerator construction, boat hulls, panels for recreation vehicles, door panels, wall panels, headliners for sea and air vehicles, etc. Generally, the thermoplastic sheet is presented as the exterior surface of the composite while the cellular insulation material is hidden from view in the end use application.

In most of these composite panels, gas filled polyurethane foam is used as the cellular insulation material and acrylonitrile-butadiene-styrene (ABS) polymer or rubber modified polystyrene is used as the thermoplastic sheet material. However, other thermoplastic polymeric sheet materials can be used as is discussed in greater detail below. The gas found in the cells of the insulation material is usually a halogenated aliphatic or cycloaliphatic hydrocarbon. These gases are present in the cells of the cellular insulation material as residual blowing agents. Alternately, they are incorporated into the cells by design in order to improve the thermal insulation properties of the cellular material. Examples of these hydrocarbons include trichlorofluoromethane, dichlorodifluoromethane, 1,1,2-trichloro-1,2,2-trifluoroethane, octafluorocyclobutane, and mixtures thereof.

Unfortunately, the composites described above suffer from a disadvantage in that the thermoplastic sheet becomes less impact resistant and more susceptible to cracking when bonded to the gas filled foam. The loss of impact resistance and the tendency to crack is reduced by the use of an elastomeric layer between the gas filled foam and the ABS as taught in U.S. Pat. No. 3,563,845 to J. Stevens. In U.S. Pat. No. 3,565,746, the same patentee teaches the use of two different layers of gas filled cellular material, which layers differ in density and compressive modulus in order to minimize loss of impact strength. Other methods used in the art to preserve the impact strength of the ABS layer include the use of a wax layer or a layer of polyethylene between the cellular material and the ABS.

The methods described above provide some improvement in the retention of impact resistance of the thermoplastic sheet laminated to the gas filled cellular material. However, the impact resistance of the thermoplastic sheet may still deteriorate due to the aging of the elastomeric or wax layers which are interposed between the cellular material and the thermoplastic sheet. In addition, the halogenated hydrocarbons in the cellular material may permeate the elastomeric, wax and polyethylene layers and attack the thermoplastic sheet. In either event the result is a decrease in impact strength of the thermoplastic sheet in the composite structure.

While the use of wax or polyethylene interlayers between the foam and thermoplastic sheet will eliminate stresses and strains which are formed in the sheet by virtue of being laminated to the foam, they give rise to another problem. The wax and polyethylene layers provide total release of the thermoplastic sheet from the foam and as a result the thermoplastic sheet tends to lose rigidity and may flex back and forth upon contact. This loss of rigidity may be avoided by the use of an adhesive layer wherein the wax coating or the polyethylene is bonded to both the urethane foam and the thermoplastic sheet, however, this, in turn, gives rise to additional manufacturing steps and expenses.

Another disadvantage of the methods used in the prior art is that the elastomeric, wax or polyethylene components must be separated from the thermoplastic sheet material in order to recycle any thermoplastic sheet, trimmings, scraps, etc. generated in the manufacturing operations as it has been found that the physical properties of the thermoplastic sheet become less desirable when they are contaminated with minor amounts of the above materials. This gives rise to further manufacturing steps if the trimmings are to be recycled.

A need exists in the art for improved composite panels wherein the thermoplastic sheet component is protected against the halogenated hydrocarbons found in the cellular insulation material bonded to the thermoplastic sheet while maintaining the rigidity and impact strength of the composite panel.

SUMMARY OF THE PRESENT INVENTION

The present invention relates to improved composite panels comprising (1) a sheet of a thermoplastic material bonded to (2) rubber-modified high nitrile polymer which contains from 55 to 85 percent by weight, based on the total polymer weight, of a nitrile monomer unit and from 5 to 30 percent by weight of a synthetic or natural rubber component; which is bonded to; (3) a cellular insulation material wherein the cells in the insulation material are filled with a major amount of a halogenated aliphatic or cycloaliphatic hydrocarbon.

The present invention also relates to an improvement in the process for preparing a composite panel, a sheet of a thermoplastic polymer and a layer of a gas filled cellular material wherein a major amount of the cells in the insulation material are filled with a halogenated aliphatic or cycloaliphatic hydrocarbon, the improvement which comprises using a thermoplastic sheet material which has bonded thereto a coextensive sheet of a rubber-modified high nitrile polymer wherein the rubber-modified high nitrile polymer is also bonded to the foam in the resulting composite structure wherein the rubber-modified high nitrile polymer contains from 55 to 85 percent by weight, based on the total polymer weight, of a nitrile monomer unit and from 5 to 30 percent by weight of a synthetic or natural rubber component.

The nitrile polymer layer presents a barrier to the halogenated hydrocarbons found in the cellular material and minimizes the degradation of the thermoplastic sheet material by the halogenated hydrocarbons, used in the present invention. Moreover, the rubber modified nitrile polymer provides a release surface between the cellular material and the thermoplastic sheet material which results in improved impact resistance in the composite.

DESCRIPTION OF THE DRAWINGS

FIG. I illustrates a cross section of a composite of the present invention wherein a thermoplastic sheet 1 is bonded to a rubber modified high nitrile polymer 2.

FIG. II illustrates a cross section of a composite prepared from a thermoplastic sheet which is bonded to a rubber modified high nitrile polymer 2 which in turn is bonded to a layer of cellular material 3.

FIG. III illustrates a cross section of a composite panel used in a recreation vehicle comprising an exterior surface 4, a cellular material 3, which is bonded to a composite of a rubber modified high nitrile polymer film 2, which in turn is bonded to a thermoplastic sheet 1, wherein the thermoplastic sheet 1 forms the interior surface of the vehicle.

FIG. IV illustrates a cross section boat hull construction wherein the cellular material 3 is sandwiched between two layers of a rubber modified high nitrile polymer 2, which in turn is bonded to a thermoplastic sheet 1.

DESCRIPTION OF THE PREFERRED EMBODIMENTS

A — THE FOAM COMPONENT

Normally, the preferred cellular material used in the composites of the present invention is polyurethane foam, although other similar cellular material can be used. The halogenated aliphatic or cycloaliphatic hydrocarbons found in the cells are the residue of blowing agents or else are deliberately placed in the cells to enhance the thermal insulation properties of the cellular material. Examples of these halogenated hydrocarbons include trichloromonofluoromethane, dichlorodifluoromethane, monochlorotrifluoromethane, monobromotrifluoromethane, tetrabromotrifluoromethane, monochlorodifluoromethane, trichlorodifluoromethane, trichlorotrifluoromethane, dichlorotetrafluoromethane, tetrachlorodifluoroethane, octafluorocyclobutane, etc. Mixtures of the foregoing halogenated hydrocarbons are also used.

B — THE THERMOPLASTIC SHEET COMPONENT

The preferred thermoplastic sheet material is an acrylonitrilebutadiene-styrene (ABS) polymer which contains from 5 to 50% by weight of acrylonitrile, from 5 to 30 percent by weight of butadiene and from 20 to 90 percent by weight of styrene based on the total weight of the ABS polymer. The expression ABS is used in the generic sense and includes the known equivalents for acrylonitrile (e.g. methacrylonitrile, propacrylonitrile), butadiene (e.g. isoprene, chloroprene, etc.) and styrene (e.g. alpha-methyl styrene, halostyrene, etc.). Preferably, the ABS sheet is a high gloss, high impact material of the type conventionally used for exterior surfaces. The ABS sheet materials used to prepare the thermoplastic sheet component of the thermal insulation panels of the present invention are well known to those skilled in the art. These materials are described at length in U.S. Pat. Nos. 3,563,845, 3,565,746, 3,509,237 and Belgian Pat. No. 803,853, all of which are incorporated herein by reference. Consequently, no further description of these well known ABS materials is required here.

Other thermoplastic materials which can be used in the present invention include polyvinyl chloride, polycarbonate, polymethyl methacrylate, etc. providing that such materials are adversely effected by exposure to halogenated hydrocarbons and further that these other thermoplastic materials will adhere to the rubber modified high nitrile polymers.

C — THE RUBBER MODIFIED HIGH NITRILE POLYMER COMPONENT

1 — IN GENERAL

The rubber modified high nitrile polymer layer used in the present invention contains at least 55 percent by weight of a nitrile monomer unit, based on the total polymer weight, wherein the weight percent of nitrile monomer is calculated as acrylonitrile. The nitrile monomers used include acrylonitrile, methacrylonitrile, ethacrylonitrile, propacrylonitrile, glutaronitrile, methyleneglutaronitrile, fumaronitrile, etc., as well as mixtures of these monomers. The preferred nitrile monomers are acrylonitrile, methacrylonitrile, and mixtures thereof.

The preferred high nitrile polymers are polymers of a nitrile monomer and at least one comonomer. The preferred comonomers which are interpolymerized with the nitrile monomers include monovinyllidene aromatic hydrocarbon monomers such as styrene, alpha-methyl styrene, halostyrene, etc.; lower alpha olefins containing from 2 to 6 carbon atoms such as ethylene, propylene, butylene, isobutylene, etc.; acrylic acid and methacrylic acid and the corresponding alkyl acrylate and alkyl methacrylate esters wherein the alkyl group contains from 1 to 4 carbon atoms such as methyl acrylate, ethyl acrylate, propyl acrylate, butyl acrylate and the corresponding methacrylates; vinyl esters such as vinyl acetate; alkyl vinyl ethers wherein the alkyl group contains from 1 to 4 carbon atoms such as methyl vinyl ether, ethyl vinyl ether, etc., and mixtures of the foregoing.

The high nitrile polymers used in the present invention contain from 5 to 30 percent and more preferably from 7.5 to 20 percent by weight of a synthetic or natural rubber component such as polybutadiene, polyisoprene, neoprene, nitrile rubbers, acrylate rubbers, natural rubbers, acrylonitrile-butadiene copolymers, ethylene-propylene copolymers, chlorinated rubber, etc., which is used to strengthen or toughen the high nitrile polymer layer. The percent rubber referred to above is that of the rubber substrate based on the total high nitrile polymer composition.

The rubbery component may be incorporated into the high nitrile polymer by any of the methods which are well known to those skilled in the art, e.g., direct polymerization of monomers, grafting the nitrile monomer onto the rubbery backbone, polyblend of a rubber graft polymer with a matrix polymer, etc.

2 — RUBBER MODIFIED HIGH NITRILE POLYMERS OBTAINED BY GRAFT TECHNIQUES

The preferred method for incorporating a rubber component into the high nitrile polymers of the present invention is by grafting the rubber substrate with a monomer mixture to form a graft polymer comprising a superstrate polymer grafted onto the rubber substrate. The graft polymer component is then blended with a high nitrile polymer component (the matrix polymer) to form a rubber modified high nitrile polymer blend. The nitrile content of the superstrate polymer should be at least 40 percent by weight based on the weight of the superstrate in order to provide good compatibility and adhesion to the matrix polymer. Preferably, the superstrate polymer grafted on the rubber substrate is similar in composition to that of the high nitrile matrix polymer with which it is blended to form the resulting high nitrile polymer blend.

The rubber substrate onto which the monomers are grafted are diene rubbers or mixtures of diene rubbers, i.e., any rubbery polymers (a polymer having a second order transition temperature less than 0°Centigrade, preferably less than −20°Centigrade, as determined by ASTM Test D-746-52T) of one or more conjugated, 1,3-dienes, e.g., butadiene, isoprene, piperylene, chloroprene, etc. Such rubbers include homopolymers and interpolymers of conjugated 1,3-dienes with up to about 45 percent by weight of one or more copolymerizable monoethylenically unsaturated monomers, such as monovinylidene aromatic hydrocarbons (e.g., styrene, halostyrene, alpha-methylstyrene, etc.); ethylenically unsaturated nitriles such as acrylonitrile, methacrylonitrile; alkyl acrylates (e.g., methyl acrylate, butyl acrylate, 2-ethylhexyl acrylate, etc.), the corresponding alkyl methacrylates, acrylamides (e.g., acrylamide, methacrylamide, N-butyl acrylamide, etc.); unsaturated ketones (e.g., vinyl methyl ketones, methyl isopropenyl ketone, etc.); alpha olefins (e.g., ethylene propylene, etc.); pyridines; and the like.

A preferred group of rubbers are those consisting essentially of 65 to 100 percent by weight of butadiene and/or isoprene and up to 35 percent by weight of a monomer selected from the group consisting of styrene, acrylonitrile, methacrylonitrile, and alkyl acrylates and methacrylates, wherein the alkyl group contains from 1 to 4 carbon atoms and mixtures of the foregoing. Particularly advantageous substrates for preparing polymer blends are interpolymers of 90 to 70 percent by weight butadiene and 10 to 30 percent by weight styrene.

The average particle size of the rubber substrate prior to grafting may vary from as little as 0.01 micron to as large as about 10.0 microns, and preferably about 0.08 to 2.0 microns for optimum benefit to impact properties.

As will be readily appreciated, the ratio of the grafted polymer superstrate to the rubber substrate may vary widely and is generally within the range of 0.1 to 2.0 parts by weight of rubber substrate. The preferred composite graft copolymers have a superstrate:substrate ratio of about 0.1 to 1.6:1.0.

3 - THE MATRIX POLYMER

The preferred copolymers for use as the matrix component of the preferred rubber modified high nitrile polymers used in the present invention are those nitrile polymers containing from 55 to 85 percent by weight, based on the total polymer weight, of a nitrile monomer selected from the group consisting of acrylonitrile and/or methacrylonitrile (wherein the weight percent of methacrylonitrile is calculated as acrylonitrile) and from 15 to 45 percent by weight of a comonomer selected from the group consisting of monovinylidene aromatic hydrocarbon monomers and alkyl ester of acrylic acid and methacrylic acid where the alkyl group contains from 1 to 4 carbon atoms and mixtures thereof.

When acrylonitrile is used as the sole nitrile monomer, the preferred range is from 60 to 85 percent by weight, based on the weight of the matrix polymer of acrylonitrile, whereas with methacrylonitrile the preferred range is from 70 to 98 percent by weight of methacrylonitrile which corresponds to about 55 to 78 percent by weight of nitrile monomer calculated as acrylonitrile. The preferred monovinylidene aromatic hydrocarbon monomers are styrene and alphamethylstyrene while the preferred alkyl esters are methyl, acrylate, ethyl acrylate and methyl methacrylate.

In addition, the above copolymers may contain up to 10 percent of an additional monomer as for example, lower alpha olefins containing 2 to 6 carbon atoms such as ethylene, propylene, butylene, isobutylene, etc.; vinyl esters such as vinyl acetate; alkyl vinyl ethers wherein the alkyl group contains from 1 to 4 carbon atoms such as methyl vinyl ether, ethyl vinyl ether, etc., and mixtures of the foregoing.

The amount of the matrix polymer used in the present invention depends on the rubber level desired in the blend and the degree of grafting onto the rubber substrate. In general, the amount of the matrix polymer used is selected to provide a final polyblend with a rubber content in the range of from 5 to 30 percent by weight and more preferably from 7.5 to 20 percent by weight based on the total weight of the polyblend composition, i.e., grafted rubber and matrix polymer.

4 — RUBBER MODIFIED HIGH NITRILE POLYMERS OBTAINED BY TWO STEP GRAFTING TECHNIQUES

The especially preferred rubber modified high nitrile polymer component used in the composites of the present invention are the two stage grafted rubbers which are taught in U.S. Pat. No. 3,671,607 to Lee et al., which is incorporated herein by reference. Especially preferred rubber components are prepared from butadiene-styrene rubbers having a butadiene content of from 60 to 80 percent by weight, a particle size in the range of from 0.06 to 0.2 micron before grafting, a gel content in the range of from 40 to 95 percent and a swelling index in the range of from 10 to 40. These especially preferred rubbers are grafted in two stages using a first and second polymerizable monomer composition.

The first polymerizable monomer composition grafted onto the rubber comprises (1) from 0.1 to 2 percent by weight, preferably 0.1 to 1 percent by weight, of nonconjugated diolefin monomer, (2) from 0 to 30 percent by weight of an ethylenically unsaturated nitrile selected from the group consisting of acrylonitrile, and mixtures of acrylonitrile and methacrylonitrile which contain up to 20 percent by weight of methacrylonitrile, (3) from 40 to 60 percent by weight of a vinylidene aromatic hydrocarbon monomer and (4) from 20 to 50 percent by weight of an alkyl ester of acrylic or methacrylic acid wherein the alkyl group contains from 1 to 8 carbon atoms, wherein the percent by weight referred to above is based on the total weight of the first polymerizable monomer mixture.

The nonconjugated diolefins employed in the practice of this invention are monomers which have two nonconjugated ethylenically unsaturated double bonds per molecule, such that at least one double bond reacts readily causing the diolefin to interpolymerize with the other monomers used in the first polymerizable monomer formulation. Preferably, these diolefins have two ethylenically unsaturated double bonds with a different degree of reactivity or having a crosslinking efficiency of less than one. These diolefins may be aliphatic, aromatic, aliphatic-aromatic, heterocyclic, cycloaliphatic, etc. Examples of suitable diolefins would include divinyl benzene, ethylene dimethacrylate, ethylene glycol dimethacrylate, triethylene glycol dimethylacrylate, tetraethylene glycol dimethacrylate, polyethylene glycol dimethacrylate, allyl methacrylate, diallyl fumarate, diallyl maleate, vinyl crotonate, and nonconjugated alpha, omega-diolefins of at least 5 carbon atoms such as 1,4-pentadiene, 1,7-octadiene, etc. Ethylene glycol dimethacrylate is the preferred difunctional monomer.

The monovinylidene aromatic hydrocarbons which are used in the superstrate are the same as those discussed above with styrene and alphamethylstyrene being preferred.

The alkyl esters of acrylic acid and methacrylic acids used in the first polymerizable monomer composition are those wherein the alkyl group contains from 1 to 8 carbon atoms, e.g., methyl, ethyl, propyl, butyl, 2-ethylhexyl, etc. Examples of such esters include methyl acrylate, ethyl acrylate, butyl acrylate, methyl methacrylate, butyl methacrylate, 2-ethylhexylmethacrylate, etc. The preferred ester is methyl methacrylate. A particularly preferred first polymerizable monomer composition contains (1) 0.1 to 2 percent by weight of ethylene glycol dimethacrylate; (2) 20 to 30 percent by weight of acrylonitrile; (3) 40 to 60 percent by weight of styrene; and (4) 20 to 50 percent by weight of methyl methacrylate; wherein the percent by weight referred to above is based on the total weight of the first polymerizable monomer mixture.

The second polymerizable monomer composition contains from 55 to 85 percent by weight of an ethylenically unsaturated nitrile monomer selected from the group monovinylidene of acrylonitrile and mixtures of acrylonitrile and methacrylonitrile which contains up to 20 percent by weight of methacrylonitrile based on the total weight of acrylonitrile and methacrylonitrile.

The second polymerizable monomer composition contains from 15 to 45 percent by weight of a monovinylidene aromatic hydrocarbon monomer such as styrene and alpha methylstyrene. Up to 10 percent of the monovinylidene aromatic hydrocarbon monomer can be replaced with a vinylidene monomer selected from the group consisting of alkyl vinyl ethers wherein the alkyl group contains from 1 to 4 carbon atoms, vinyl esters such as vinyl acetate and alkyl esters from acrylic and methacrylic acids wherein the alkyl groups contain from 1 to 8 carbon atoms.

The preferred vinylidene monomers, which are used to replace up to 10 percent by weight of the monovinylidene aromatic hydrocarbon, include methyl vinyl ether, ethyl vinyl ether, methyl acrylate, ethyl acrylate, butyl acrylate and the corresponding methacrylates, especially methyl methacrylates.

The grafted superstrate contains a total of at least 40 percent by weight ethylenically unsaturated nitrile monomer and the ratio of grafted superstrate to substrate is in the range of from 15-200:100.

The percent by weight referred to above in regard to the second monomer composition is based on the total weight of the monomers in the second monomer composition. The above specified rubber particle size, gel content, swelling index and second order transition temperature is required in order to provide optimum impact properties.

Preferably, the two stage grafted rubbers described above are blended with a matrix polymer which contains from 55 to 85 percent, preferably 60 to 70 percent by weight, based on the total weight of the polymer of an ethylenically unsaturated nitrile monomer selected from the group consisting of acrylonitrile and mixtures of acrylonitrile and methacrylonitrile which contain up to 20 percent by weight of methacrylonitrile based on the total weight of acrylonitrile and methacrylonitrile and from 15 to 45 percent of a monovinylidene aromatic hydrocarbon monomer of the type referred to above. Up to 10 percent of the monovinylidene aromatic hydrocarbon monomer can be replaced with a vinylidene monomer as outlined above.

Preferably, the composition of the matrix polymer is substantially the same as the composition of the second polymerizable monomer composition.

D — THE ABS/RUBBER MODIFIED HIGH NITRILE POLYMER COMPOSITE

Preferably, the ABS sheet and the rubber modified high nitrile polymer are bonded together to form a unitary structure prior to forming the foam/high nitrile polymer/ABS composite. This may be accomplished by laminating the ABS sheet to a film or sheet of the high nitrile polymer using heat and pressure or by using suitable adhesives. Alternately, either the ABS component or the high nitrile component may be melt extruded onto a preformed film or sheet of the other component. In another method the ABS and high nitrile polymer components are co-extruded to form a composite. In still another method a solution or dispersion of either the ABS or the high nitrile polymer component is applied to a preformed film or sheet of the other component followed by removal of the solvent or dispersion medium. Other methods for forming composites will be obvious to those skilled in the art upon reading the present specification. The preferred methods are bonding the materials together using heat and pressure by extruding one material onto the other or by co-extrusion or bi-extrusion methods.

Preferably, the thickness of the ABS component of the composite is in the range of from 1,250 to 18,750 microns (50 to 750 mils) in order to obtain the desired degree of structural rigidity and impact.

Preferably, the thickness of the rubber modified high nitrile polymer component is in the range of from about 12 to 500 microns (0.5 to 20 mils). More preferably, the high nitrile polymer component has a thickness in the range of from about 12 to 120 microns (0.5 to 5.0 mils) for ease of fabrication when using lamination (heat and pressure), co-extrusion and bi-extrusion methods to form the ABS/rubber modified high nitrile polymer assembly.

To produce an especially preferred ABS/rubber modified high nitrile polymer composite suitable for insulating panels that can be vacuum formed and bonded to a polyurethane foam it is preferred to laminate a rubber modified high nitrile polymer film having a thickness of from 25 to 75 microns (1 to 3 mils) to an ABS sheet that is from 1,250 to 18,750 microns (50 to 750 mils) thick.

The exact thickness of the ABS sheet or nitrile polymer film depends on the properties required. For many purposes a high nitrile polymer film having a thickness of from 25 to 50 microns gives sufficient barrier qualities or chemical resistance. However, laminates which need greater barrier qualities or greater chemical resistance will require a thicker high nitrile polymer film for example having a thickness of from 50 to 100 microns (2 to 4 mils) thick and such thicker films are also desirable for laminates which are to form very deep drawn formings since the films and sheets can become thin in the areas of maximum stretch after deep drawn forming.

The ABS and rubber modified high nitrile polymer components may be oriented or unoriented. There appears to be no advantage to using oriented materials and the use of unoriented materials is preferred to avoid any dimensional changes which may occur in the sheet upon loss of orientation during heating or processing while making the ABS/rubber modified nitrile polymer composite.

The ABS/rubber modified high nitrile polymer composites used in the present invention should have a bond strength sufficient to enable the composite to maintain its integrity during the construction operation, e.g., handling, assembly, foaming-in-place and thereafter without any substantial separation. The composite should have a bond strength such that a force of at least 178.6 gms/cm and preferably 357.2 gms/cm is required to separate the individual components of the composite. These bond strengths are readily achieved using the methods outlined above.

The composite of the invention can be of any convenient length and width.

E — THE FOAM/RUBBER MODIFIED HIGH NITRILE POLYMER/ABS COMPOSITE

The foam member of the composite is usually prepared by foaming-in-place techniques. This involves positioning the ABS/rubber modified high nitrile polymer composite in a suitable jig or mold. A foamable mixture is then introduced between the ABS/nitrile polymer composite and the wall of the jig or mold. The resulting foam adheres to the rubber modified high nitrile polymer to provide an integral composite structure. In an optional embodiment, the foamable mixture is poured between the ABS/rubber modified high nitrile polymer composite and a member such as enamelled steel, wood, plastic, etc. which forms an exterior surface on the other side of the foam opposite to the rubber modified high nitrile polymer.

The foam can be cured by conventional heating methods or by infrared or microwave heating methods if so desired. The foam bonds to the inside of the exterior portion and the high nitrile surface of the ABS/high nitrile polymer composite during this process and secures them in the spaced relationship thereby enabling a rigid structure of high strength to be obtained.

The preferred foamable or foaming composition is a polyurethane and the technique used for filling the space can be any of the conventional compositions and techniques used for filling spaces and voids in-situ. Examples of suitable compositions and techniques are described in "Rigid Plastic Foams" by T. H. Ferrigno, published by Reinhold Publishing Corp., second edition, 1967, pages 1–206.

Alternately, the foam can be laminated to the ABS/high nitrile polymer composite using suitable adhesives or melt adhesion techniques. The bond strengths of the foam to the rubber modified high nitrile polymer should be such that the ABS/nitrile polymer/foam composite maintains its integrity without any substantial separation of the respective components. The bond strengths of the foam to the rubber modified high nitrile polymer are in the same ranges discussed above for the ABS/high nitrile composite. The bond strengths are obtained quite readily during the foam-in-place operation.

The surface of the foam opposite to that bonded to the rubber modified high nitrile polymer may be bonded to high nitrile polymer materials or to other materials such as metals, e.g., steel, enamelled steel, stainless steel, aluminum, wood as well as to other plastic materials. Combinations of the above such as decorative plastic overlays on metal or wood may also be used. This may be done during the foaming-in-place or in a separate step wherein the exposed foam surface of the ABS/rubber modified high nitrile polymer/foam composite is bonded to a substrate.

The following examples are set forth in illustration of the present invention and are not to be construed as a limitation thereof. Unless otherwise indicated all parts and percentages are by weight.

EXAMPLE I

This example illustrates a two stage graft polymerization reaction to prepare a rubber modified polymer which is then used to prepare the composite structures of the present invention.

A butadiene-styrene (70 percent butadiene - 30 percent styrene) latex, which is further characterized as follows:

| | |
|---|---|
| Solids | ~ 40% by weight |
| pH | 8.5–8.8 |
| Surface tension | 68–72 dynes/cm |
| Average particle size | 0.09 to 0.1 micron |
| Gel content | 89% to 93% |
| Swelling Index | 12 – 16 |
| Refractive index $n_d^{25}$ | 1.5375 – 1.5395 |
| Tg | <–40°C. | is diluted to 20 percent rubber solids. One percent (1 percent) of sodium lauryl sulfate is added to the latex which is charged to a reactor and heated under nitrogen and with agitation to about 60°C. An aqueous solution of 1.0 parts of sodium formaldehyde sulfoxylate and a small quantity of chelated iron is added before graft monomer addition. To this latex is continuously added over a one hour period a first monomer composition of 100 parts acrylonitrile, 200 parts styrene, 100 parts methyl methacrylate and 4 parts ethylene glycol dimethacrylate. During monomer addition, 1 part of potassium persulfate in aqueous solution is charged to the reactor. Stirring is continued during the addition of the first monomer composition and is continued for an additional period of one hour thereafter. Then, 0.8 part of sodium formaldehyde sulfoxylate and 0.8 part of potassium persulfate in aqueous solution is added to the latex and a second monomer composition of 130 parts acrylonitrile, 70 parts styrene and 2 parts tert-dodecyl mercaptan is continuously added to the reactor over a one-half hour period. Towards the end of the second monomer composition addition, a solution of 11 parts sodium lauryl sulfate is charged to the reactor, and agitation and heating are continued for about 30 minutes. The latex is then cooled to 25°C. and 5 parts of a conventional antioxidant is added to the batch. The latex is then coagulated in a hot aqueous magnesium sulfate solution, the coagulum is filtered, washed with water and dried.

The graft copolymer prepared above is blended with a matrix copolymer of 63 percent by weight acrylonitrile and 37 percent by weight styrene previously prepared by conventional suspension polymerization to provide blends with variations in the amount of rubber in the polyblend. The rubber graft and matrix polymers are compounded by extrusion.

EXAMPLES 2 to 6

These examples illustrate the resistance to halogenated hydrocarbons which is exhibited by the high nitrile polymer sheet material used in the present invention.

A conventional ABS sheet containing 23 percent by weight acrylonitrile, 10 percent butadiene and 67 percent styrene (available commercially as LUSTRAN Q394, a registered trademark of Monsanto Company) having a thickness of about 0.254 cm (100 mils) is laminated to various high nitrile polymeric sheet materials using heat (80°C.) and pressures in the range of from 3.5 to 5.6 kg/cm$^2$ (50 to 80 psi).

The laminates are cut into 5 cm × 5 cm squares and placed over 50 cm$^3$ bottles containing 10 to 20 cc of liquid Freon $^{(R)}$ R-11 (a registered trademark of E. I. duPont de Nemours & Company). Weights, and in some instances, adhesive tape, are used to hold the test sample in place over the vapors. The average exposure area of the laminate to the Freon vapors is 3 sq. cm. The concentration of Freon is the equilibrum vapor pressure of Freon to 25°C. and 50 percent relative humidity air. The exposure period is one week or about 168 hours. Freon is added as necessary to maintain 10 to 22 cc in the bottles.

At the end of this time the samples are evaluated in order to determine the effect of the halogenated hydrocarbon vapors on the ABS component of the samples. The results of this test are outlined in Table I below.

TABLE I

SUMMARY OF EXAMPLES 2 to 6

RESISTANCE OF HALOGENATED HYDROCARBONS

| Example | High Nitrile Polymer Composition | Halogenated Hydrocarbon Resistance |
|---|---|---|
| 2 | None - ABS Control | ABS slightly swollen and more brittle than unexposed ABS |
| 3 | Acrylonitrile/styrene 63% 37% | No Change |
| 4 | Acrylonitrile/styrene (63/73) containing 15% rubber | No Change |
| 5 | Acrylonitrile/methylacrylate/butadiene rubber (70/22/8) | No Change |
| 6 | Methacrylonitrile/styrene (90/10) | No Change |

The rubber modified high nitrile polymer used in Example 4 is that prepared in Example 1 above. The rubber modified high nitrile polymer used in Example 5 is a grafted polymer commercially available from Standard Oil of Ohio under the trademark of Barex 210. The high nitrile polymers used in Examples 2 to 5 have a thickness of about 25 microns (one mil) while in Example 6 the thickness is about 50 microns (2 mils).

The results in Table I above demonstrate the halogenated hydrocarbon resistance of the high nitrile polymer films used. In their absence, the ABS is swollen and slightly embrittled when tested by impacting. At the higher temperatures experienced in foaming-in-place polyurethane significantly more attack is expected in those areas of the structure where the halogenated hydrocarbon becomes trapped between the foam and the ABS sheet.

Examples 7 to 16

The following examples illustrate the permeability properties of various polymeric materials to halogenated hydrocarbons.

The polymeric materials are formed into films from about 25 to 75 microns (1 to 3 mils) thick. Permeability is measured on a Park Cell using the method and apparatus described by W. R. Park, Semimicro Gas Permeability Apparatus for Sheet Material, Anal. Chem., Volume 29, pages 1897-9 (1957). The halogenated hydrocarbon used is dichlorodifluoromethane which is available commercially as Freon 12, a registered trademark of E. I. duPont de Nemours & Company.

The results of the permeability tests are tabulated in Table II below:

TABLE II

SUMMARY OF EXAMPLES 7 to 16

PERMEABILITY TESTS

| Example | Composition | Thickness Microns | Mils | Temperature (°C) (1) | Permeability Factor (2) |
|---|---|---|---|---|---|
| 7 | Polyethylene (high density) | 50 | 2 | 25 | 20 |
|   |   |   |   | 50 | 70 |
| 8 | Polyethylene (low density) | 50 | 2 | 25 | 70 |
| 9 | Saran | 50 | 2 | 25 | 35 |
| 10 | Polyvinyl Chloride | 50-75 | 2-3 | 25 | 0.1 |
|    |   |   |   | 25 | 115 |
|    |   |   |   | 50 | 200 |
| 11 | ABS (23% AN) | 50-75 | 2-3 | 25 | 115 |
|    |   |   |   | 50 | 170 |
| 12 | ABS (38% AN) | 25 | 1 | 50 | 12 |
| 13 | Acrylonitrile/styrene (63/37) | 25 | 1 | 25 | 0.1 |
|    |   |   |   | 50 | 0.1 |
|    |   |   |   | 70 | 0.1 |
| 14 | Acrylonitrile/styrene (63/37) containing 15% rubber | 25 | 1 | 25 | 0.1 |
|    |   |   |   | 50 | 0.1 |
|    |   |   |   | 70 | 0.1 |
| 15 | Methacrylonitrile/styrene (90/10) | 25 | 1 | 25 | 0.1 |
|    |   |   |   | 50 | 0.1 |
|    |   |   |   | 70 | 0.1 |
| 16 | Methacrylonitrile/styrene/butadiene (90/10) containing 15% rubber | 25 | 1 | 25 | 0.1 |
|    |   |   |   | 50 | 0.1 |
|    |   |   |   | 70 | 0.1 |

(1) Temperature used for Permeability test.
(2) Permeability factor in cc/24 hr./cm$^2$/micron/(kg/cm$^2$)

The ABS polymer used in Example 11 contains 23 percent acrylonitrile, 10 percent butadiene and 67 percent styrene based on the weight of the polymer. The ABS polymer used in Example 12 contains 38 percent acrylonitrile, 10 percent butadiene and 52 percent styrene. The rubber modified acrylonitrile polymer used in Example 13 is the same as that used in Example 4 above. The rubber modified methacrylonitrile polymer used in Example 16 is a polyblend of a butadiene rubber grafted with methacrylonitrile and styrene blended with a methacrylonitrile/styrene polymer matrix.

The data in Table II above illustrate the excellent polymerization barrier properties exhibited by the rubber modified high nitrile polymers used in the present invention (Examples 14 and 16) to the halogenated hydrocarbons found in cellular material used for thermal insulation. This barrier property of the rubber modified high nitrile polymer component of the present invention helps to protect the ABS from being attacked by the halogenated hydrocarbon used in the foaming operation.

EXAMPLES 17 to 25

These examples illustrate the impact strength of the various composites which are prepared by laminating various polymeric films including rubber modified high nitrile films to a conventional ABS sheet. The ABS used is a high impact material of the type conventionally used in the art. Specifically, the ABS contains 23 percent by weight of acrylonitrile, 10 percent by weight of butadiene and 67 percent by weight of styrene.

The laminates are prepared by extruding the ABS into a sheet and continuously laminating the ABS to various polymeric films having a thickness in the range of from about 25 to 50 microns (1 to 2 mils) using a temperature of about 80°C. and nip roll pressures in the range of from 3.5 to 5.6 kg/cm². The resulting laminates are then tested for impact strength using the Falling Dart Impact (FDI) test described in U.S. Pat. No. 3,563,845 which is incorporated herein by reference. The FDI test conducted at 23°C. (73°F.) wherein the laminate is impacted on the ABS sheet side to simulate impact conditions that might be expected in composite construction.

A second set of test laminates is prepared by laminating the ABS/film composites described above to a slab of polyurethane foam having a thickness of about 3.8 cm (1.5 inches) to form an ABS/polymer/foam composite. The composite is prepared by placing a 30 cm × 60 cm sheet of the previously laminated ABS/polymeric film composite inside an aluminum mold (30 cm × 60 cm × 3.8 cm) with the high nitrile polymer film facing the inside of the mold. The mold assembly is then placed in an air oven and heated to 40° to 50°C. A foamable urethane composition (General Latex two component Vultafoam 16F-1402) is then injected through a port in the mold and allowed to foam-in-place between the mold and the surface of the film component. The foam, when cool, has a density of 30 to 45 kg/cu meter (2 to 3 lbs/cu. ft.). When the ABS/polymeric film/urethane foam composite is cool, it is removed and cut into 10 cm × 10 cm squares for impact testing. These samples are tested for impact strength using the FDI test on the ABS side of the composite as described above. The impact strength on the foam composites are reported as percent change in impact as compared with a control sample which was not laminated to foam.

The results of the FDI tests on the ABS/film composite and ABS/foam composites are tabulated in Table II below.

TABLE III

SUMMARY OF EXAMPLES 17 to 25

| Example | Film Composition | Falling Dart Impact Test[1] ABS/Film | ABS/Film/Foam |
|---|---|---|---|
| 17 | ABS Control not laminated | 5.8 (42) | -50 to -80 |
| 18 | High Density Polyethylene | 3.2 (23-36) | -70 to -90 |
| 19 | Polyvinyl Chloride | 6.8 (49) | -70 to -90 |
| 20 | Acrylonitrile/styrene 63%/37% | 1.4 (10) | no change |
| 21 | Acrylonitrile/styrene/butadiene rubber. From Example 1 above | 6.1 (44) | " |
| 22 | Methacrylonitrile/styrene butadiene. From Example 16 above | 5.5 (40) | " |
| 23 | Methacrylonitrile/styrene/butadiene | 1.9 (14) | " |
| 24 | Acrylonitrile/methylacrylate/butadiene AN/MA/Bd. From Example 5 above | 5.5 (40) | " |
| 25 | Acrylonitrile/styrene/butadiene (70/20/10) | 4.1 (30) | " |

[1] The FDI test results for the ABS/film composites are given in terms of kilogram-meters with the corresponding ft-lbs units in parenthesis.
The FDI test results on ABS/film/foam composites are given in terms of percent change as compared to the corresponding ABS/film composites which are not laminated to foam.

The high nitrile polymer used in Example 23 above is essentially the same as that used in Examples 16 and 22 except that it contains only 5 percent by weight of a polybutadiene rubber component. The polyethylene film has a thickness of about 50 microns (2 mils), the polyvinyl chloride has a thickness of about 50 to 75 microns (2 to 3 mils) and the nitrile polymer films have a thickness of about 25 microns (1 mil).

Referring to the FDI test data for the ABS/film composites, Control Example 17 shows the excellent impact resistance of ABS sheet which is not laminated to a polyurethane foam. Examples 21 to 25 illustrate the composites of the present invention wherein a rubber modified high nitrile polymer is bonded to the ABS sheet to provide a barrier to the halogenated hydrocarbons used in the forming of the insulation material. Examples 20 and 23 illustrate the impact resistance of a composite prepared using a high nitrile polymer with no rubber modification and with 5 percent rubber, respectively. The impact strength of the composite decreases with decreasing amounts of rubber in the high nitrile polymer component.

Referring to the FDI test data for the ABS/film/foam composites, the impact strength of the ABS component falls off drastically when laminated to foam. The loss in impact strength is still severe when polyethylene or polyvinyl chloride is interposed between the foam and the ABS sheet. However, when using a high nitrile polymer layer between the foam and the ABS there is no significant change in the impact strength of the ABS/high nitrile polymer/foam composite.

It is apparent from the above that many modifications and changes are possible without departing from the spirit and scope of the present invention. What is claimed is:

1. A composite structure comprising (1) a sheet of thermoplastic material which is bonded to; (2) a rubber modified high nitrile polymer which in turn is bonded to; (3) a layer of a gas filled cellular insulation material wherein a major amount of the cells in the insulation material are filled with a halogenated aliphatic or cycloaliphatic hydrocarbon, and wherein the rubber-modified high nitrile polymer contains from 55 to 85 percent by weight, based on the total polymer weight, of a nitrile monomer unit and from 5 to 30 percent by weight of a synthetic or natural rubber component.

2. A composite as in claim 1 wherein the cellular insulation material is polyurethane foam.

3. A composite as in claim 1 wherein the rubber-modified high nitrile polymer is prepared from a nitrile monomer selected from the group consisting of acrylonitrile, methacrylonitrile, and mixtures thereof.

4. A composite as in claim 1 wherein the rubber modified high nitrile polymer is prepared from a blend of a grafted rubber and a matrix polymer.

5. A composite as in claim 1 wherein the rubber-modified high nitrile polymer is the graft polymerization product of:
A. from 60 to 83 percent by weight of acrylonitrile and from 17 to 40 percent by weight of at least one comonomer selected from the group consisting of monovinylidene aromatic hydrocarbons, lower alphaolefins containing from 2 to 6 carbon atoms, alkyl acrylates and alkyl methacrylates, wherein the alkyl group contains from 1 to 4 carbon atoms, vinyl esters and vinyl ethers, wherein the alkyl group contains from 1 to 4 carbon atoms, and
B. from 5 to 30 percent by weight of a synthetic rubber component having a second order transition temperature of less than −20°C.

6. A composite as in claim 5 wherein the synthetic rubber component is a polybutadiene rubber containing up to about 45 percent by weight of at least one copolymerizable monoethylenically unsaturated monomer selected from the group consisting of styrene, alpha-methylstyrene, acrylonitrile, methacrylonitrile, alkyl acrylates and alkyl methacrylates, wherein the alkyl group contains from 1 to 4 carbon atoms.

7. A composite as in claim 1 wherein the rubber-modified high nitrile polymer comprises:
A. a butadiene-styrene rubbery substrate having a butadiene content of from 55 to 100 percent by weight and up to 45 percent by weight based on the total weight of the butadiene-rubbery substrate of a comonomer selected from the group consisting of styrene, alpha-methylstyrene, acrylonitrile, methacrylonitrile, alkyl acrylates and alkyl methacrylates, wherein the alkyl group contains from 1 to 4 carbon atoms, wherein the rubbery substrate has a second order transition temperature less than −40°C.; and
B. a superstrate grafted onto the rubbery substrate which superstrate comprises:
1. the polymerization product of a first polymerizable monomer composition comprising:
a. from 0.1 to 2 percent by weight of a nonconjugated diolefin monomer;
b. from 0 to 30 percent by weight of an ethylenically unsaturated nitrile monomer selected from the group consisting of acrylonitrile, and mixtures of acrylonitrile and methacrylonitrile which contain up to 20 percent by weight of methacrylonitrile;
c. from 40 to 60 percent by weight of a vinylidene aromatic hydrocarbon monomer; and
d. from 20 to 50 percent by weight of an alkyl ester of acrylic or methacrylic acid wherein the alkyl group contains from 1 to 8 carbon atoms, wherein the percent by weight is based on the total weight of the monomer in the first polymerizable monomer mixture; and
2. a second polymerizable monomer composition comprising from 55 to 85 percent by weight of an ethylenically unsaturated nitrile monomer selected from the group consisting of acrylonitrile and mixtures of acrylonitrile and methacrylonitrile which contains up to 20 percent by weight of methacrylonitrile based on the total weight of acrylonitrile and methacrylonitrile and from 15 to 45 percent by weight of a monovinylidene aromatic hydrocarbon monomer wherein the percent by weight is based on the total weight of the monomers in the second polymerizable monomer mixture;

wherein the grafted superstrate contains a total of at least 40 percent by weight ethylenically unsaturated nitrile monomer and wherein the ratio of grafted superstrate to substrate is in the range of from 15–200:100.

8. A composite comprising a sheet of acrylonitrile-butadiene-styrene copolymer bonded to a layer of gas filled insulation material, said sheet having laminated thereto a coextensive sheet of a rubber-modified high nitrile polymer wherein the rubber-modified high nitrile polymer is in laminated contact with the foam in the resulting composite wherein the rubber-modified high nitrile polymer is the graft polymerization product of:
A. from 60 to 83 percent by weight of acrylonitrile and from 17 to 40 percent by weight of at least one comonomer selected from the group consisting of monovinylidene aromatic hydrocarbons, lower alphaolefins containing from 2 to 6 carbon atoms, alkyl acrylates and alkyl methacrylates, wherein the alkyl group contains from 1 to 4 carbon atoms, vinyl esters and vinyl ethers, wherein the alkyl group contains from 1 to 4 carbon atoms, and B. from 5 to 30 percent by weight of a synthetic rubber component having a second order transition temperature of less than −20°C.

9. A composite as in claim 8 wherein the synthetic rubber component is a polybutadiene rubber containing up to about 45 percent by weight of at least one copolymerizable monoethylenically unsaturated monomer selected from the group consisting of styrene, alpha-methylstyrene, acrylonitrile, methacrylonitrile, alkyl acrylates and alkyl methacrylates, wherein the alkyl group contains from 1 to 4 carbon atoms.

10. A composite as in claim 8 wherein the rubber-modified high nitrile polymer comprises:

A. a butadiene-styrene rubbery substrate having a butadiene content of from 55 to 100 percent by weight and up to 45 percent by weight based on the total weight of the butadiene-rubbery substrate of a comonomer selected from the group consisting of styrene, alpha-methylstyrene, acrylonitrile, methacrylonitrile, alkyl acrylates and alkyl methacrylates, wherein the alkyl group contains from 1 to 4 carbon atoms, wherein the rubbery substrate has a second order transition temperature less than −40°C.; and B. a superstrate grafted onto the rubbery substrate which superstrate comprises:

1. the polymerization product of a first polymerizable monomer composition comprising:

a. from 0.1 to 2 percent by weight of a nonconjugated diolefin monomer;

b. from 0 to 30 percent by weight of an ethylenically unsaturated nitrile monomer selected from the group consisting of acrylonitrile, and mixtures of acrylonitrile and methacrylonitrile which contain up to 20 percent by weight of methacrylonitrile;

c. from 40 to 60 percent by weight of a vinylidene aromatic hydrocarbon monomer; and d. from 20 to 50 percent by weight of an alkyl ester of acrylic or methacrylic acid wherein the alkyl group contains from 1 to 8 carbon atoms, wherein the percent by weight is based on the total weight of the monomer in the first polymerizable monomer mixture; and 2. a second polymerizable monomer composition comprising from 55 to 85 percent by weight of an ethylenically unsaturated nitrile monomer selected from the group consisting of acrylonitrile and mixtures of acrylonitrile and methacrylonitrile which contains up to 20 percent by weight of methacrylonitrile based on the total weight of acrylonitrile and methacrylonitrile and from 15 to 45 percent by weight of a monovinylidene aromatic hydrocarbon monomer wherein the percent by weight is based on the total weight of the monomers in the second polymerizable monomer mixture;

wherein the grafted superstrate contains a total of at least 40 percent by weight ethylenically unsaturated nitrile monomer and wherein the ratio of grafted superstrate to substrate is in the range of from 15-200:100.

* * * * *